United States Patent [19]

Bordner et al.

[11] 3,891,489

[45] June 24, 1975

[54] PRESSURE CURE METHOD OF MAKING RESIN PIPE

[75] Inventors: Dalton W. Bordner, Fullerton; Harlan H. Kline, Diamond Bar, both of Calif.

[73] Assignee: Ameron, Inc., Brea, Calif.

[22] Filed: Nov. 24, 1969

[21] Appl. No.: 879,337

[52] U.S. Cl. ............... 156/171; 156/173; 156/286; 156/287; 156/190; 156/195
[51] Int. Cl. ............................................ B65h 81/00
[58] Field of Search ........... 156/187, 171, 188, 173, 156/195, 190, 285, 286, 287, 392

[56] References Cited
UNITED STATES PATENTS

| | | | |
|---|---|---|---|
| 2,417,881 | 3/1947 | Munger | 156/287 X |
| 2,894,538 | 7/1959 | Wilson | 156/195 |
| 3,159,515 | 12/1964 | Dunlap et al. | 156/190 |
| 3,194,711 | 7/1965 | Pasternach | 156/285 X |
| 3,336,176 | 8/1967 | Medney | 156/173 |
| 3,340,117 | 9/1967 | Inoue | 156/285 X |
| 3,400,029 | 9/1968 | Mesrobian et al. | 156/195 X |
| 3,519,520 | 7/1970 | Newman | 156/287 X |

*Primary Examiner*—Stephen J. Lechert, Jr.
*Attorney, Agent, or Firm*—Howard A. Silber

[57] ABSTRACT

A chemical resistant pipe having a resin-rich liner and a filament wound wall, the pipe being substantially free of trapped air pockets and pits, and a pressure cure method of making same. In a preferred embodiment, the pipe comprises a polyester resin liner reinforced with an angel-hair glass surfacing mat and asbestos web and surrounded by a glass filament wound wall. The pipe is produced by wrapping resin-impregnated reinforcement about a mandrel to form the liner, spiral winding glass roving over the liner to form the wall, placing the mandrel and uncured pipe into a pressure chamber, introducing gas under pressure into the chamber external to the mandrel, and rapidly heating the mandrel interior to accomplish curing of the resin.

15 Claims, 4 Drawing Figures

PATENTED JUN24 1975 3,891,489
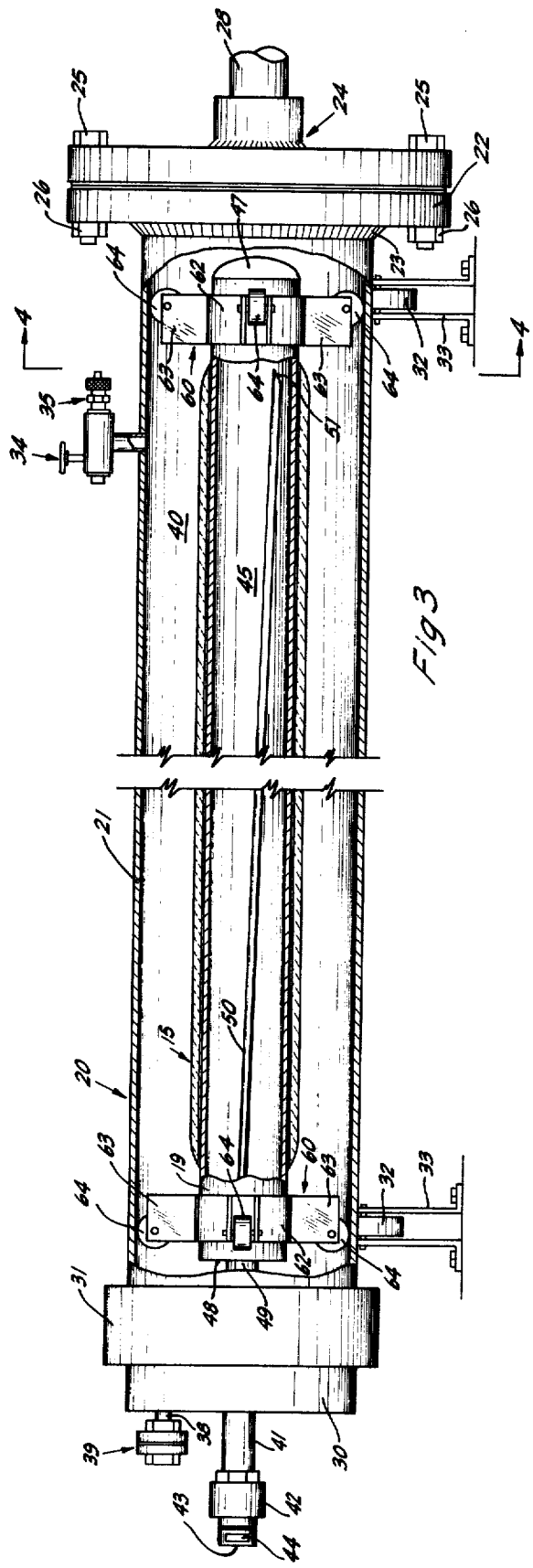
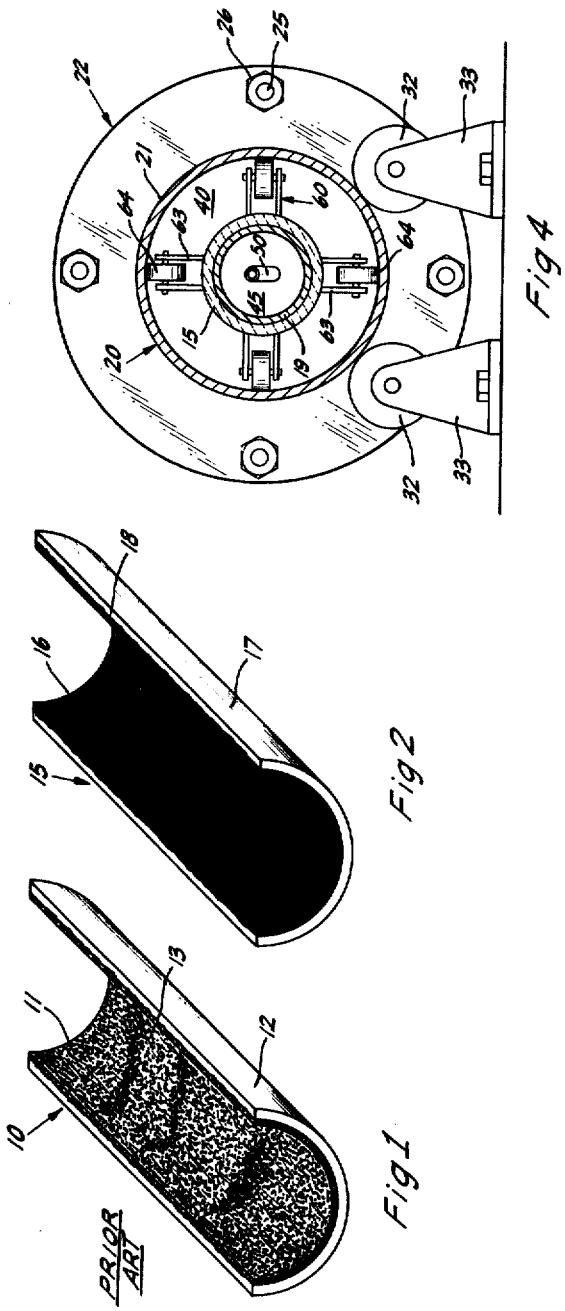
Fig 1
Fig 2
Fig 3
Fig 4
INVENTORS
DALTON W. BORDNER
HARLAN H. KLINE
BY Hinderstein & Silber
ATTORNEYS

PRESSURE CURE METHOD OF MAKING RESIN PIPE

BACKGROUND OF THE INVENTION

1. Field of the Invention.

The present invention relates to a chemical resistant pipe having a resin liner and a filament wound wall, and to a pressure cure method of making the same. More particularly, the invention relates to an improved resin pipe formed on a mandrel and cured by rapidly heating the mandrel interior while exposing the pipe exterior to gas under pressure.

2. Description of the Prior Art.

Reinforced resin pipe has found widespread acceptance in plumbing systems for handling corrosive materials. Of particular usefulness are pipes having a polyester resin liner surrounded by spiral wrapped glass filament or roving. The resin liner provides good corrosion resistance to both acids and alkalis flowing through the system, while the spiral wound glass wall provides physical rigidity and strength for the pipe.

A serious shortcoming of all prior art resin pipes is the presence of large numbers of trapped air pockets or pits in the resin liner. Such trapped air pockets result in an irregular, frothy white appearance of the interior pipe surface, as illustrated by the prior art pipe segment of FIG. 1. The air pockets are not limited to the interior surface, but are present throughout the thickness of the liner, and at the interface between the liner and the exterior wall.

As a result of the presence of these small voids or trapped air pockets, the corrosion resistance of such prior art resin pipe is severely reduced. Such pipes tend to become delaminated, particularly at the liner-wall interface, and often develop leakage. A significant percentage of the pipes manufactured are rejected because of leakage detected at the time of fabrication. Moreover, the rough, mottled liner surface appearance detracts from the commercial saleability of the product.

The trapped air pockets or pits characteristic of the above-described resin pipe result from the prior art methods of pipe fabrication. In general, such pipes are prepared by wrapping resin impregnated asbestos mat or other reinforcement about a mandrel, followed by spiral winding of resin coated glass filaments around the liner. The mandrel then is removed from the wrapping lathe and transported, usually by overhead crane, onto a moving track which rotates the mandrel about its longitudinal axis while moving the mandrel horizontally through a furnace. The furnace temperature varies from a relatively low value, typically about 180° F., at the input end to a much higher temperature, typically on the order of 325° F., near the output end. The transit time of the pipe through the oven typically is on the order of one hour.

Because the mandrel is heated externally, the resin in the wall near the outside surface of the pipe tends to gel or cure first. Resin from the interior of the pipe and particularly from the liner tends to migrate towards the outside surface, with the result that the interior liner becomes "dry," that is, resin starved and porous. Air trapped within the interior of the pipe and particularly in the liner region cannot escape because the gelled resin at the exterior surface forms a hard, air impervious coating. The heat applied to cure the pipe causes the trapped air bubbles to expand, thereby forming the trapped air pockets and pits characteristic of prior art resin pipe.

Several approaches have been tried in the past to eliminate the problem of trapped voids or air pockets in resin pipe. One approach is to wrap a resin impregnated asbestos or other reinforcement material about a mandrel, and then run pressure rollers over the wrapped liner to squeeze out trapped air bubbles. Additional layers of resin and reinforcement then are applied to build up a structural wall, each layer being rolled to break up and remove the trapped air. While this rolling technique significantly reduces the number and size of trapped air bubbles, the requirement for rolling each layer adds considerably to the cost of fabrication, and hence is not commercially satisfactory.

Another approach of the prior art is to cure the resin pipe in an autoclave. In such approach, the entire mandrel and wrapped pipe is placed in a pressure chamber and high pressure steam introduced into the chamber exterior of the mandrel. This autoclave technique requires complex equipment, and has the disadvantage of first curing the pipe exterior, still resulting in trapped air pockets, although of smaller size due to the pressure exerted by the steam.

A different prior art approach involves placing a plastic bag around the wrapped, uncured pipe and mandrel, and applying hydraulic pressure against the pipe through the bag. While the pressure exerted by the bag tends to reduce the size of the trapped air pockets, other serious disadvantages are incurred. The pressure applied through the bag is exerted not only on the liquid resin but also directly on the wrapped glass fibers, tending to compress and deform the glass. The pressure also tends to cause resin flow out from between the glass filaments, thereby reducing the rigidity of the resultant structure. When the bag is removed, the pipe has a messy external appearance which is commercially unsatisfactory. Further, if a bubble of air should be trapped between the bag and the glass, an unsightly hump may result in the finished product.

Other problems associated with prior art chemical resistant resin pipes relate to the particular resin system utilized. Although a polyester resin is preferred for the pipe liner, because of its excellent chemical resistance, curing of such polyester pipe presents still other problems in addition to that of trapped air pockets. First, commercial polyester resins contain a high percentage of styrene, some of which is vaporized during the heat cure process. Vaporized styrene and air is explosive, thus presenting a severe hazard in the manufacturing process. Further, surface inhibition of the polyester results from exposure to oxygen. While this problem can be solved by overwrapping the pipe with a release film, the additional film application and removal steps add significantly to the pipe fabrication cost.

Another problem associated with polyester resins is that they tend to shrink during cure by about 6% to 9% by volume, the shrinkage setting up stress within the resin. The polyester shrinkage often caused delamination and cracking, particularly at the liner-wall interface. Approaches to solution of this problem include the use of a marquisette tie-down to compress the polyester liner prior to wall formation, and the use of a special binder resin at the interface between the liner and wall. Clearly, such solutions added to the cost and complication of pipe fabrication.

These and other problems of the prior art are overcome by using the inventive pressure cure method of making resin pipe. The inventive process utilizes a minimum of steps, and results in production of a resin pipe which is virtually free of trapped air pockets or pits. The pipe is of smooth, pleasing appearance, both on internal and external surfaces, and exhibits virtually no tendency to leakage or delamination. Chemical resistance of pipe produced by the inventive pressure cure process is superior to that of resin pipe produced by prior art methods. Further, the method lends itself readily to the fabrication of all-polyester pipe, free of the problems associated with styrene loss, surface inhibition and shrinkage.

SUMMARY OF THE INVENTION

In accordance with the present invention, there is provided a chemical resistant resin pipe and a pressure cure method of making the same. The pipe is characterized by having a resin-rich liner which is substantially free of trapped air pockets and pits.

The pipe is produced by wrapping resin impregnated surfacing mat and asbestos web or other reinforcement about a mandrel, followed by spiral winding of resin coated glass filament or roving. The mandrel and uncured pipe then are placed in a pressure chamber and the region interior of the chamber, but exterior of the mandrel, filled withn a gas under pressure. Gas under pressure of at least 35 psig has been found satisfactory, excellent results being achieved with a pressure on the order of 60 psig. When using an epoxy resin, any gas may be used in the chamber; for polyester resins, nitrogen or $CO_2$ have been found particularly useful.

Next, the mandrel itself is heated rapidly, preferably by introducing steam into the mandrel interior. While the mandrel temperature is not critical, good results are obtained when the mandrel is heated to between about 200° F. and about 400° F. Preferably, the mandrel is heated sufficiently rapidly so that the liner-wall interface will heat up at about the same rate as the mandrel and pipe liner. Under these conditions, complete curing of the pipe normally can be effected in less than 15 minutes.

The rapid internal heating of the mandrel, combined with external pneumatic pressure on the pipe being cured, permit fabrication of resin pipe which is substantially free of trapped air pockets or pits. The pipe liner has a density higher than that obtained by conventional fabrication techniques, and the pipe exhibits significantly improved chemical resistance, has excellent appearance, and is virtually free of leakage and delamination problems. The process further permits fabrication of all-polyester filament wrapped pipe.

Thus it is an object of the present invention to provide an improved resin pipe characterized by the absence of trapped air pockets or pits.

Another object of the present invention is to provide a novel pessure cure method of producing a resin pipe.

It is another object of the present invention to provide a method for curing a resin pipe formed on a mandrel, comprising subjecting the exterior of the pipe to gas under pressure while rapidly heating the mandrel interior.

Still another object of the present invention is to provide a method for producing a resin pipe comprising the steps of forming a resin impregnated liner and wall about a mandrel, enclosing the mandrel and pipe in a pressure chamber, introducing gas under a pressure of at least 35 psig into the chamber and steam heating the mandrel interior.

It is still another object of the present invention to provide a method for producing a polyester pipe, and characterized by curing the pipe in a pressure chamber filled with nitrogen or $CO_2$ while rapidly heating the pipe.

Yet another object of the present invention is to provide an apparatus for pressure curing a resin pipe.

A further object of the present invention is to provide a chemical resistant pipe including an asbestos-reinforced, resin-rich liner having high density and characterized by an absence of voids, and surrounded by a spiral wrapped wall of glass filament or roving.

BRIEF DESCRIPTION OF THE DRAWINGS

Still other objects, features, and attendant advantages of the present invention will become apparent to those skilled in the art from a reading of the following detailed description of the preferred embodiments constructed in accordance therewith, taken in conjunction with the accompany drawings wherein like numerals designate like parts in the several figures, and wherein:

FIG. 1 is a perspective view of a semi-cylindrical section of a resin pipe fabricated in accordance with the prior art;

FIG. 2 is a perspective view of a semi-cylindrical section of a resin pipe fabricated in accordance with the inventive pressure cure method;

FIG. 3 is a side elevation view, partly broken away and in section, of an apparatus useful for practicing the inventive pressure cure method of fabricating resin pipe; and FIG. 4 is a sectional view of the apparatus of FIG. 3 as viewed generally along the line 4—4 thereof.

DESCRIPTION OF THE PREFERRED EMBODIMENTS

Referring now to the drawings, and particularly to FIG. 1 thereof, there is shown a semi-cylindrical section of a typical resin pipe 10 fabricated in accordance with the prior art. Pipe 10 includes an interior liner 11 fabricated of asbestos mat or like material and impregnated with polyester, epoxy or other resin. Liner 11 is surrounded by a wall 12 which may be fabricated of spiral wrapped fiberglass filament or roving, impregnated with epoxy or other resin. Wall 12 gives structural rigidity to pipe 10.

As a result of the fabrication methods used, as discussed hereinabove, virtually all prior art resin pipe of the type discussed include a very large number of trapped air pocket or pits in liner 11. As a result, the interior surface of liner 11 has an irregular, frothy white appearance as illustrated in FIG. 1. Voids or trapped air pockets are present throughout liner 11, as well as at the interface 13 between liner 11 and wall 12.

Because of the large surface area exposed by the irregular interior surface of liner 11, resulting from trapped air pockets, chemical attack can occur far more readily than if liner 11 were free of such irregularities. Thus, chemical resistance of pipe 10 is reduced significantly. Moreover, the presence of pits or trapped air pockets in liner 11 increases the chances of leakage through the liner. In addition, the irregularities at interface 13 often result in delamination, with sections of liner 11 actually becoming detached from the surrounding portions of wall 12.

FIG. 2 shows a semi-cylindrical section of a resin pipe 15 in accordance with the present invention and fabricated by the pressure cure method. In contrast to prior art pipe 10, pipe 15 includes a resin liner 16 which is virtually free of trapped air pockets or pits. As a result, the interior surface of void-free liner 16 is smooth and continuous. Resin liner 16 is surrounded by a wall 17 which may be fabricated of spiral wrapped glass filament or roving. Because of the absence of trapped air pockets or pits, the interface 18 between liner 16 and wall 17 is smooth and regular; there is little or no tendency for delamination at interface 18.

In a preferred embodiment, liner 16 (FIG. 2) comprises alternate layers of surfacing mat and asbestos, each layer being impregnated with polyester or other resin. A preferred form of surfacing mat is non-woven, angel-hair-like glass sheet, of the type sold by Owings-Corning under the trade name "C-Veil" and having a thickness of about 0.010 inch. Alternatively, a surfacing mat of Dynel or like material may be used. The surfacing mat serves to retain a large volume of resin relative to the volume of the mat, and thus provides a resin-rich liner surface. The asbestos, which typically may be in the form of a mat or web, adds rigidity to liner 16, serves as a carrier for the resin, and enhances the chemical resistance of pipe 15. Wall 17 preferably comprises several layers of spiral-wrapped glass roving impregnated with an appropriate resin.

Resin pipe 15 is fabricated on a mandrel (such as mandrel 19 shown in FIG. 3) of stainless steel or like material. The mandrel initially is coated with a release agent such as Mylar film or a release compound of a type well known in the art. Next, a layer of resin-impregnated surfacing mat is spiral wrapped over the mandrel. As noted, the surfacing mat holds considerable resin, but itself is of little mass, thus resulting in a resin-rich interior liner surface. This is followed by spiral wrapping of resin-impregnated asbestos web; the width and wrap angle of the web may be adjusted to provide overlap if desired. Additional alternate layers of resin-impregnated surfacing mat (e.g., glass sheet) and asbestos may be wound about the mandrel to complete formation of liner 16. Wall 17 then is formed by spiral winding resin-impregnated glass filament or roving about the previously wrapped liner 16.

To effectuate pressure cure of the resin pipe so formed, the mandrel 19 containing the uncured pipe is placed in a pressure chamber such as chamber 20 shown in FIGS. 3 and 4. Referring thereto, pressure chamber 20 is seen to include an elongate, cylindrical outer wall 21 formed of steel or other material capable of withstanding high pressure. One end of cylindrical wall 21 is rigidly attached to a disc-shaped end plate 22 having a diameter greater than that of cylindrical wall 21, so as to form a flange 23. End plate 23 itself is connected to a flanged coupling member 24 by means of bolts 25 and nuts 26. Coupling member 24 itself is rigidly coaxially attached to a shaft 28 which may be attached to a motor (not shown) for rotating chamber 20 about its longitudinal axis.

The other end of cylindrical wall 21 is sealed with a removable end closure 30 which is connected to cylindrical wall 21 by means of a vitaulic coupling 31. Chamber 20 is supported by sets of rollers 32 which, as best shown in FIG. 4, may be mounted on appropriate brackets 33. Roller supports 32 permit rotation of chamber 20 in a horizontal plane under motive power supplied via shaft 28. Cylindrical wall 21 also is provided with a pressure bleed valve 34 and a safety valve 35.

Still referring to FIG. 3, extending through end closure 30 is a first line 38 connected to a rotating pressure joint 39. Gas under pressure may be introduced into the interior 40 of pressure chamber 20 via pressure joint 39 and line 38. End closure 30 also comprises a coaxial bore (hidden in FIG. 3) from which extends a line 41 terminating in a rotating pressure coupling 42. Coupling 42 has two separate concentric channels therethrough, the first channel terminating at an end opening 43 and used to introduce steam into the interior 45 of mandrel 19, and the second channel terminating at a side opening 44, and used as a steam return.

In the embodiment illustrated in FIG. 3, pipe 15 is formed about the mandrel 19 which has a hollow interior 45. A first end 47 of mandrel 19 is closed. The other end 48 of mandrel 19 is closed except for an opening (hidden in FIG. 3) to which is attached a tube 49. Tube 49 is of sufficient length so as to seat within the concentric bore of end closure 30 and thus communicate with line 41 and opening 44.

Steam is supplied to the interior 45 of mandrel 19 via a tube 50 having an outer diameter somewhat smaller than the inner diameter of tube 49 or line 41. One end of tube 50 extends through tube 49, line 41 and the center of concentric coupling 42, terminating at end opening 43. Tube 50 extends within interior 45 for most of the length of mandrel 19, the interior end 51 of tube 50 being open.

The configuration just described permits steam to be introduced via open end 43, rotating coupling 42, tube 50 and tube end 51 into mandrel interior 45. The steam return is via tube 49 and line 41 exterior of tube 50, the outer coaxial portion of coupling 42 and side opening 44.

To support mandrel 19 within chamber 20, there are provided a pair of removable carriage units 60 (see FIGS. 3 and 4). Each of carriage units 60 includes a cylindrical collar 62 having an inner diameter just slightly larger the outer diameter of mandrel 19. This permits collar 62 to be inserted easily around mandrel 19. Extending radially outwardly from collar 62 are plurality of wheel mounts 63 to the ends of which are mounted a plurality of wheels 64. The spacing between diametrically opposite ones of wheels 64 is approximately equal to the inner diameter of cylindrical wall 21 of chamber 20.

In operation, liner 16 and wall 17 of pipe 15 are wound around mandrel 19 as described hereinabove. When the winding has been completed, mandrel 19 and pipe 15 are placed within chamber 20 to effectuate the pressure cure. This placement is accomplished by removing end closure 30 from chamber 20, positioning carriage units 60 on opposite ends of mandrel 19 and inserting the mandrel and carriage combination through the open end of chamber 20.

Once the mandrel has been placed within chamber 20, steam supply tube 50 is inserted through tube 49 into mandrel interior 45 and at the same time end closure 30 is positioned at the end of cylindrical wall 21 with line 41 in communication with tube 49. Victaulic coupling 31 then is utilized to effect pressure-tight coupling between cylindrical wall 21 and end closure 30.

Chamber 20 then may be rotated under motive force supplied via shaft 28, the rotational motion of chamber 20 being communicated via carraige units 60 to mandrel 19 and pipe 15. This rotation will prevent the uncured resin from draining or dripping from pipe 15. Of course, if a thixotropic resin system is used, such rotation may not be required.

With bleed valve 34 closed, gas under pressure is introduced into the interior 40 of chamber 20, via rotating coupling 39 and line 38. If an epoxy resin is used for pipe 15, any gas may be used; with such epoxy resin systems, air under pressure is quite satisfactory. Alternatively, if a polyester resin system is used, the gas provided to chamber interior 40 preferably should be one which will prevent air inhibition of the polyester during cure. Nitrogen or $CO_2$ gas each are satisfactory for this purpose. Preferably, the gas introduced into chamber interior 40 should be under a pressure of at least 35 pounds per square inch guage (psig).

When the interior 40 of chamber 20 has reached the desired pressure, the gas source (not shown) may be disconnected and coupling 36 appropriately closed or capped off. The pressure exerted by the gas within chamber 20 tends to compress the resin portions of tube 15 toward the outer surface of mandrel 19. Note that there is no path for gas communication between chamber interior 40 and the interior 45 of mandrel 19.

Next, steam is introduced into the interior 45 of mandrel 19 via rotating concentric coupling 42 and tube 50, as described above, the steam return being via tube 49, coupling 42 and opening 44. The steam rapidly heats mandrel 19. Preferably, the temperature range to which mandrel 19 is heated is on the order of from about 200°F. to about 400°F. In this temperature range, rapid cure of the resin included in pipe 15 is achieved. During the curing period, safety valve 35 prevents the pressure of the gas in chamber interior 40 from increasing to an unsafe level.

Resin cure apparently begins at the interior surface of pipe 15. Thus, unlike prior art methods wherein the exterior surface is cured first, air is not trapped within tube 15 by such a cured exterior surface. Moreover, the gas under pressure within chamber 37 tends to compress any air which may remain trapped in pipe 15, thereby decreasing the volume of the resultant air pocket to negligible size. Moreover, the rapid heating of mandrel 19 insures that the liner-wall interface 18 of tube 15 will increase in temperature at about the same rate as mandrel 19. This close temperature profile relationship appears to produce pipe which is least likely to become delaminated.

When curing has been completed, valve 34 is opened to relieve the pressure within chamber 20. At the same time, supply of steam is cut off, thereby causing cooling of mandrel 19. When the pressure has been relieved, end closure 30 is removed, mandrel 19 is rolled out of chamber 20, and carriage units 60 are removed. Pipe 15 is withdrawn from mandrel 19 in a conventional manner. The result is a pipe 15 having the appearance and characteristics discussed hereinabove in conjunction with FIG. 2. Although not required, cooling may be accelerated by introducing a fluid at lower temperature within mandrel 19.

By way of specific example, an all-polyester resin pipe was fabricated in accordance with the present invention using two layers of "C-Veil" glass surfacing mat, alternated with two layers of asbestos web. Both surfacing mat and web were impregnated with a polymerizable vinyl ester resin in which the terminal portions of the resin comprised vinyl ester groups and in which the main polymeric chain between the terminal groups comprised the residue of a polyepoxide, polyisocyanate and/or polyamine. Such a polyester is sold commerically under the trade name "Derakane." The liner was formed on a two inch diameter stainless steel mandrel having a 0.1 inch thick wall. Two layers of glass roving, impregnated with the same polyester resin as the liner, were spiral wound atop the liner.

The mandrel and uncured pipe were placed in a pressure chamber such as that described in conjunction with FIGS. 3 and 4 hereinabove and exposed to nitrogen gas under pressure of 60 psig. Steam at a temperature of about 340°F. and a pressure of about 110 to 130 psig was introduced into the interior of the mandrel. The liner-wall interface followed approximately the same heat-up profile as the steel mandrel and inside liner. The steam was supplied for a period of 10 minutes, after which the cured pipe was allowed to cool prior to removal from the pressure chamber.

The resultant pipe had the appearance shown in FIG. 2, and was substantially free of trapped air pockets and pits. The pipe exhibited excellent chemical resistance, had smooth internal and external appearance and showed no tendency toward delamination.

The polyester pipe just described was exposed to a 21 percent solution of HCl at 200°F. for an extended period of time. A pipe fabricated of identical materials, but made in accordance with prior art techniques (i.e. not pressure cured in accordance with the present invention) was exposed to the same HCl solution as a control. The pressure cured polyester pipe showed no attack after one month. After about 1½ months exposure to the HCl, some possible blistering was noted. In contrast, the control pipe exhibited severe blistering in a period of less than two weeks. The pipes also were exposed to a 15 percent solution of NaOCl at 100°F. for a period of one month. No attack was noted during this time, either of the control or of the pressure cured pipe.

When using the inventive pressure cure technique, little or no styrene vapor is lost from the polyester during cure. By using nitrogen or $CO_2$ as the pressure gas, the danger of explosion from a styrene-air mixture is eliminated as a hazard of manufacture. Moreover, the use of nitrogen or $CO_2$ as the pressure gas prevents surface inhibition of the polyester resin.

Similar pipe was fabricated with the inventive pressure cure method using propoxylated bisphenol-A fumarate polyester resin of the type sold by the Atlas Chemical Company under the trade name "Atlac." Pipe fabricated with such resin also was free of trapped air pockets and pits, and showed significant improvement in chemical resistance over pipe of like material fabricated in accordance with the prior art. Pipe using epoxy resin throughout was fabricated using the pressure cure technique, with excellent results. Pipe having a polyester liner and an epoxy wall also may be fabricated using the inventive technique.

The inventive process also is applicable to furan and phenolic resin systems. When using such systems, it is desirable to use a higher gas pressure within the curing chamber than for polyester. For example, when using a furan resin system, gas pressure on the order of 100 psig is preferred. This pressure is sufficient to prevent rapid water vapor expansion from the resin during cure. Similarly, high pressures on the order of 100 psig are desirable when using phenolic resins.

Although described in conjunction with formation of resin pipe having liner and wall portions, the invention is not so limited. Thus, the inventive pressure cure process may be used to produce resin pipes which have no separate wall or no separate liner.

While the invention has been described with respect to the preferred physical embodiments constructed in accordance therewith, it will be apparent to those skilled in the art that various modifications and improvements may be made without departing from the scope and spirit of the invention.

We claim:

1. The improvement in the manufacture of resin pipe, comprising:
   winding an uncured resin impregnated pipe on a mandrel,
   rapidly heating said pipe to a temperature in the range of from 200°F to 400°F from the interior of said mandrel to cure said resin, said heating being sufficiently rapid so that the heat-up profiles at different radii within said pipe are substantially uniform,
   subjecting the unenveloped pipe, during said heating, to pneumatic pressure provided by exposing said pipe exterior directly to gas under pressure of at least 35 psig, and
   rotating said pipe and mandrel during said heating to prevent uncured resin from draining from said pipe.

2. The improvement of claim 1 wherein said resin comprises a polyester and wherein said gas is one of nitrogen or $CO_2$.

3. A process for the manufacture of resin pipe, said process comprising the steps of:
   forming an uncured resin pipe on a mandrel,
   placing said pipe and mandrel in a pressure chamber with no shielding material around said pipe,
   introducing gas into said chamber under sufficient pressure to compress the resin portions of said unshielded pipe,
   internally heating said mandrel while said pipe is exposed to the pressure of said gas, and
   rotating said mandrel and pipe during said heating to prevent uncured resin from draining from said unshielded pipe.

4. A process as defined in claim 3 wherein said mandrel is heated to a temperature between about 200°F and 400°F, and wherein said pressure is at least 35 psig.

5. A process as defined in claim 3 wherein said gas comprises one of air, nitrogen or $CO_2$.

6. A process as defined in claim 3 wherein said resin comprises a polyester and wherein said gas comprises one of nitrogen or $CO_2$.

7. A process as defined in claim 3 wherein said resin comprises a furan or a phenolic and wherein said pressure is at least 60 psig.

8. A process as defined in claim 3 wherein said mandrel is steam heated.

9. A process as defined in claim 3 wherein said forming comprises:
   wrapping resin-impregnated surfacing mat about said mandrel, and
   spiral-winding resin-impregnated glass filament or roving about said wrapped surfacing mat.

10. A process as defined in claim 3 wherein said forming comprises:
    wrapping alternating layers of resin-impregnated surfacing mat and resin-impregnated asbestos about said mandrel to form a pipe liner, and
    spiral-winding resin-impregnated glass filament or roving about said pipe liner to form a pipe wall.

11. A process as defined in claim 10 wherein said resin comprises a polyester, and wherein said gas comprises one of nitrogen or $CO_2$.

12. A process as defined in claim 11 wherein said gas is under pressure of about 60 psig.

13. A process for the manufacture of resin pipe, comprising the steps of:
    wrapping layers of epoxy or polyester-resin-impregnated fibrous material about a mandrel to form a pipe liner,
    spiral winding epoxy or polyester-resin-impregnated glass filament or roving about said pipe liner to form a pipe wall,
    placing said mandrel, pipe liner and pipe wall, uncovered by a protective envelope or bag, within a pressure chamber,
    introducing air, nitrogen or $CO_2$ gas into said pressure chamber to expose directly said pipe exterior to gas under pressure of at least 35 psig,
    heating said mandrel to a temperature of between about 200°F and 400°F, thereby heating said pipe liner and pipe wall sufficiently rapidly so that the heat-up profiles at different radii within said pipe are substantially uniform, and
    rotating said mandrel and pipe during said heating and while subjecting said pipe to said gas under pressure, to prevent uncured resin from draining or dripping from said pipe.

14. A process according to claim 13 wherein said pipe liner and pipe wall both are polyester-resin-impregnated, and wherein said introduced gas is nitrogen or $CO_2$.

15. A process for the manufacture of resin pipe, comprising the steps of:
    wrapping layers of furan or phenolic-resin-impregnated fibrous material about a mandrel to form a pipe liner,
    spiral winding furan or phenolic-resin-impregnated glass filament or roving about said pipe liner to form a pipe wall,
    placing said mandrel, pipe liner and pipe wall, uncovered by a protective envelope or bag, within a pressure chamber,
    introducing air, nitrogen or $CO_2$ gas into said pressure chamber to expose directly said pipe exterior to gas under pressure of at least 60 psig,
    heating said mandrel to a temperature of between about 200°F and 400°F, thereby heating said pipe liner and pipe wall sufficiently rapidly so that the heat-up profiles at different radii within said pipe are substantially uniform, and
    rotating said mandrel and pipe during said heating and while subjecting said pipe to said gas under pressure, to prevent uncured resin from draining or dripping from said pipe.

* * * * *